United States Patent [19]

Francis et al.

[11] Patent Number: 4,581,671
[45] Date of Patent: Apr. 8, 1986

[54] MAGNETIC TAPE RECORDING AND PLAYBACK SYSTEM

[75] Inventors: David B. Francis, Mt. Kisco, N.Y.; Ronald L. Meggison, Willingboro, N.J.

[73] Assignee: International Business Machines Corporation, Armonk, N.Y.

[21] Appl. No.: 505,581

[22] Filed: Jun. 20, 1983

[51] Int. Cl.⁴ .......................... G11B 5/008; A61B 5/04
[52] U.S. Cl. .................................... 360/137; 128/711; 346/33 ME; 360/6
[58] Field of Search ................... 360/6, 137, 131–132, 360/134; 128/710–711; 354/275; 346/33 ME, 33 M

[56] References Cited

U.S. PATENT DOCUMENTS

| | | | |
|---|---|---|---|
| 4,072,972 | 2/1978 | Gold | 354/275 |
| 4,183,354 | 1/1980 | Sibley et al. | 128/711 |
| 4,333,475 | 6/1982 | Moreno et al. | 128/711 |

Primary Examiner—John H. Wolff
Assistant Examiner—David J. Severin
Attorney, Agent, or Firm—Robert E. Sandt

[57] ABSTRACT

A magnetic tape recording and playback system having a tape cassette and battery pack joined by a frangible connection in an integral assembly, wherein for recording the assembly provides battery power to the recorder and the recorder provides recording signals to the cassette, and for playback, the battery is broken away from the cassette and discarded and the cassette is inserted into the playback unit, which can accept only the cassette without the battery. This prevents re-use of the cassette in the recorder and assures the use of a fresh battery for each recording session.

2 Claims, 7 Drawing Figures

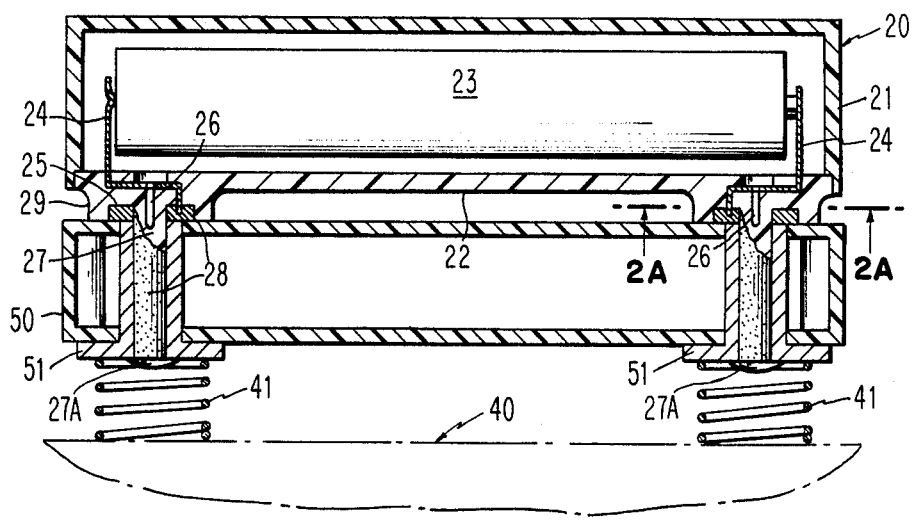
FIG. 2
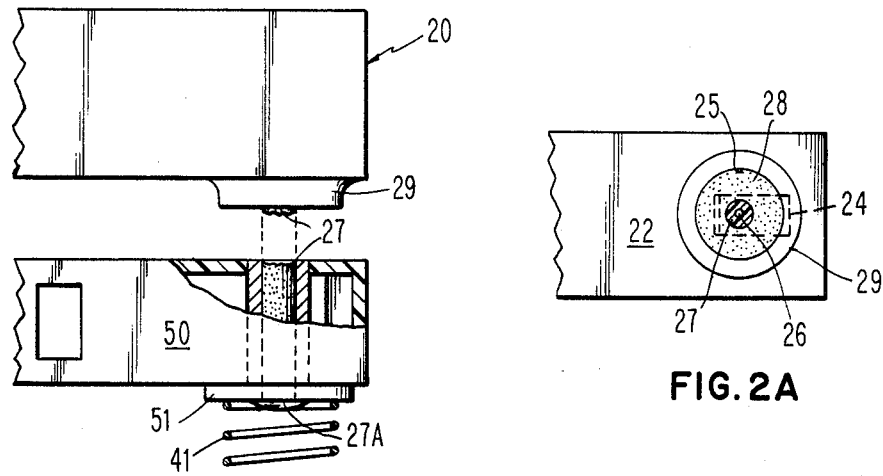
FIG. 3
FIG. 2A
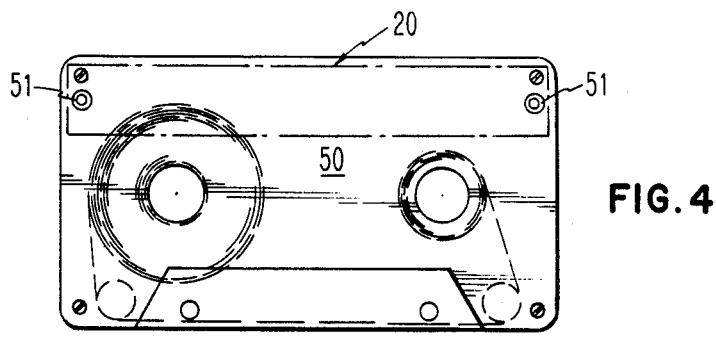
FIG. 4

MAGNETIC TAPE RECORDING AND PLAYBACK SYSTEM

This invention relates to telegraphones and more particularly to a magnetic recording and playback system useful for the recording and playback of physiological phenomena.

BACKGROUND INFORMATION

It has been a well-known practice in cardiology to record electrocardiograph data over a protracted period, usually twenty-four hours, on a battery-powered magnetic tape recorder carried by the patient, and then play back this recording at many times (usually 60× or more) the recording speed for analysis. The taped record may include recorded time or other indicia to correlate aberrations in the heartbeat with significant stressful or other events during the recording session. The analysis of the recorded electrocardiograph record may be achieved by a computer program or by observation by a skilled technician, either of which marks portions of the record for printout and detailed study by a cardiologist.

In such a protocol it is desirable that the portable recording unit be as small and light as possible. Thus, it is common practice to employ magnetic tape cassettes such as those used in audio recorders. A C-120 cassette is one such type of cassette.

Since a twenty-four hour recording requires a very slow tape speed and since the ECG signals must be recorded with very high fidelity, it is a necessity that very high quality tape be used and that a previously unused (virgin) tape be used. To enhance the fidelity and compensate for the slow tape speed, analog to digital conversion and multi-channel recording may be utilized.

Another necessity, in addition to the use of a virgin tape, is the assurance of the use of a fresh battery for each use. To issue instructions to the patient or the installing technician may not in all cases assure a virgin tape and a fresh battery. While a weak battery or used tape is not injurious to the patient, the test procedure is vexatious, and it is certainly desirable to minimize the chances of producing an inferior and possibly unusable record.

It is known in the art of photography to package a film pack and battery in an integrated package in self-developing "instant" camera. This one-time use assures a fresh battery for each film pack. However, once exposed the film cannot be re-used, so there is no concern over the re-use of the film.

SUMMARY OF THE INVENTION

It is therefore an object of this invention to provide a portable battery-operated magnetic tape recorder and playback system having an integrated tape cassette and battery pack assembly which coacts with the recorder to deliver battery power thereto and to receive magnetic recording signals therefrom, and the cassette and battery pack assembly having a frangible connection between the cassette and battery pack which must be broken to allow insertion of the cassette into the playback unit.

Another object is to provide in a system in accordance with the foregoing object a magnetic tape cassette connected to a battery pack by a frangible connection which when unbroken produces an integrated assembly.

These and other objects, features and advantages of the invention will be apparent from the following more particular description of the preferred embodiment of the invention as illustrated in the accompanying drawings.

BRIEF DESCRIPTION OF THE DRAWINGS

FIG. 2 is a sectional view of the cassette and battery pack in its assembled state.

FIG. 2A is a sectional view in the direction of the arrows in FIG. 2.

FIG. 3 shows the frangible disconnected state of the cassette and battery pack.

FIG. 4 shows the position of the electrical connections on the cassette.

DETAILED DESCRIPTION

Figure 1:
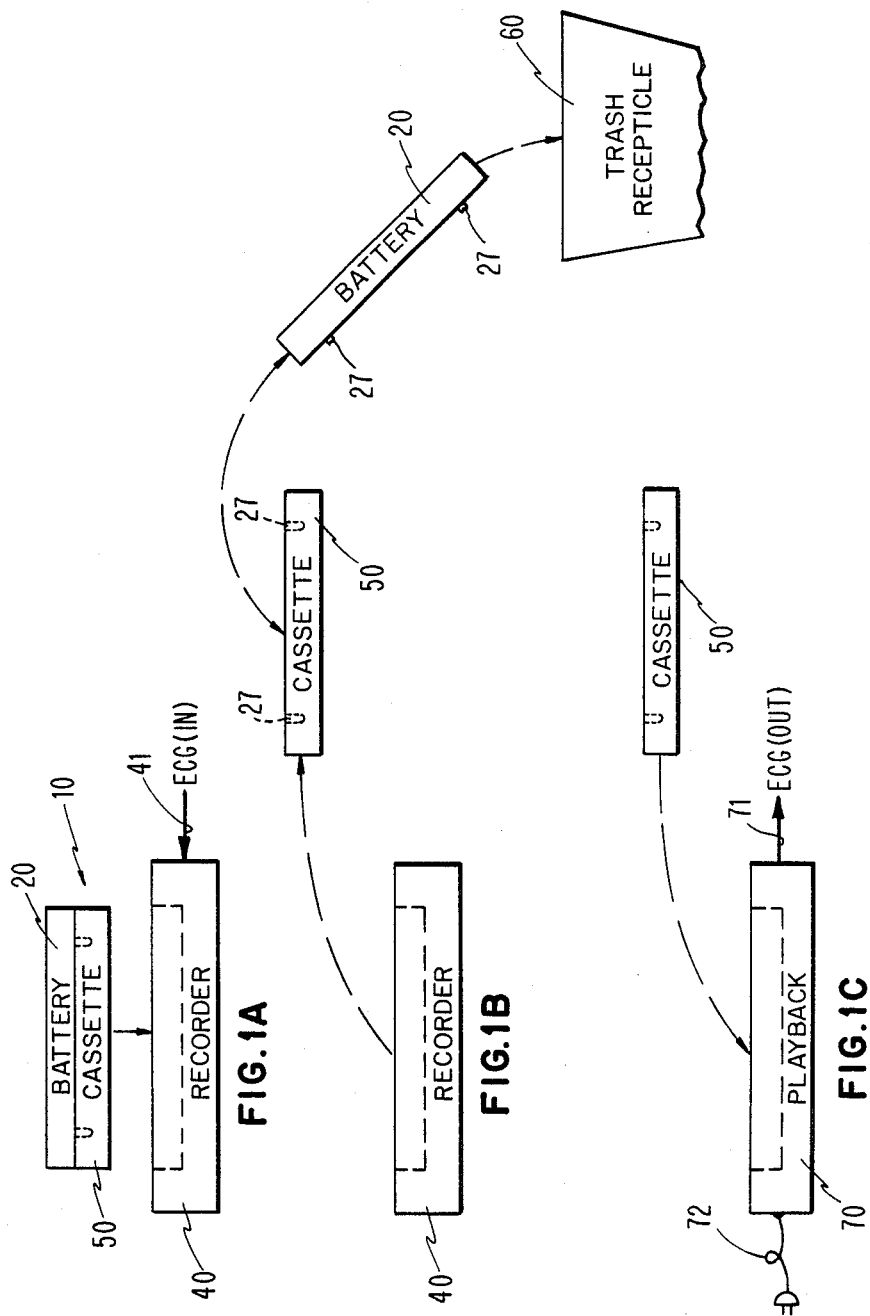
FIGS. 1A through 1C are a schematic representation of the function of the recording system.

FIG. 1A graphically illustrates the overall function of the recording system and its function to assure the use of a virgin tape and fresh battery.

In FIG. 1A the combined tape cassette 50 and the piggyback battery pack 20 is shown as an integrated assembly 10 for insertion into the recorder 40, which recorder has an input port 41 to receive the ECG (electrocardiograph) signals from attached patient electrodes. Except for contacts to receive battery power and a deeper receptacle to accept the integrated cassette/battery pack assembly 10, the recorder 40 is substantially a state-of-the-art recorder. Instead of recording in the analog mode the ECG input signals are digitized and recorded in multiple channels. A time reference signal is recorded along with the digitized ECG signals to correlate significant events, such as stress conditions with any aberrations in the ECG signal. Because of the multi-channel recording the tape cassette is not reversed, so that the piggyback battery does not interfere with the single-use operation. The tape transport speed is accurately controlled to provide a full twenty-four hour recording capability.

Once the twenty-four hour recording is completed, as shown schematically in FIG. 1B, the assembly is removed from the recorder 40 and broken apart to separate the cassette 50 from the battery pack 20. The battery pack 20 is then discarded as, for example, in trash receptable 60 with due consideration being given to protecting the non-polluting disposal thereof.

The cassette 50 is then inserted in the playback unit 70 where it is played back at high speed (24×) for analysis by a technician or by a computer program. The ECG out port 71 provides signals for analysis by other apparatus (not shown). The playback unit is powered from utility power by cord 72.

Turning now to FIG. 2 which shows the detailed construction of the cassette and battery pack in their assembled state, the cassette 50 has a pair of force fitted flanged bushings 51 which provide the electrical connection to the recorder 40 by means of coil springs 41 integral with the recorder 40.

The battery pack 20 consists of a molded case 21, lid 22, and battery 23. The space between the battery and the enclosure may be optionally filled with a potting compound or foamed in-place plastic (not shown). The battery terminals are coupled via the straps 24 which are molded into the lid 22. These straps can be soldered to the battery terminals or make electrical contact therewith because of the inherent resilience of the straps.

The straps 24 are generally Z-shaped with an opening therethrough which seats on a shouldered pin in one of the dies when the lid 22 is molded. The short leg of the Z extends into a locating hole in the second die to fix the location of the strap during molding.

This stepped pin in the mold produces a complementary stepped blind hole 26, the reduced portion of which extends into a molded pin 27 and extends slightly beyond the bottom of the annular cavity, or moat 25. The purpose of this hole in the pin 27 is to provide a weakened portion to define a fracture line when the battery pack is to be broken away. The pin 27 extends into and beyond the flange of the bushing 51 and is headed over by heating after assembly so that the head 27A prevents the pin from being withdrawn after assembly.

To provide electrical continuity between the battery 23 and the bushings 51 each of the pins 27 is metallized with a conductive metal coating 28, which metallization is continued into the moat 25 to make electrical contact with the strap 24.

The boss 29 provides the requisite material thickness to contain the strap 24 and the moat 25. FIG. 2A shows a plan view of lid 22, boss 29, filled moat 25 (with filler 28), pin 27, and weakening hole 26.

FIG. 3 illustrates the fracture of the pin 27 when the cassette 50 and battery pack 20 are subjected to a shearing force, wherein the pin 27 remains in the cassette.

FIG. 4 shows the location of bushings 51 in a position in the cassette 50 which is non-interfering with the tape. All of the active aligning holes and tape guides on the cassette are at the lower portion of the cassette, as viewed in FIG. 4.

While the battery 23 has been illustrated as being cylindrical, a flat battery whose dimensions are substantially co-extensive with the cassette will result in a flatter assembly.

With the foregoing construction it will readily be appreciated that the battery pack 20 cannot be re-used because its contact pins have been broken. This assures that a fresh battery will be used for each recording session. Likewise, the use of a virgin tape is assured because the recorder can only operate with an assembled cassette and battery pack.

Thus, with this structure the use of a virgin tape and a fresh battery is assured.

While the invention has been described with respect to the recording and playback of ECG signals, it will readily be appreciated that it may equally be well used for recording other physiological artifacts or other long-term physical phenomena for analysis and/or archival purposes.

It will further be appreciated that modifications to the described embodiment may be made without the exercise of invention or departing from the spirit of the invention as defined in the following claims.

We claim:

1. An ambulatory cardiac recording and playback system adapted to assure the use of a fresh battery and to prevent the re-use of a previously recorded-upon tape in a subsequent recording session comprising;
   (a) a portable magnetic tape recorder operable to record cardiac signals upon a magnetic tape, the said recorder having no independent power supply,
   (b) a magnetic tape cassette and battery pack assembly having the tape cassette and battery pack joined by a frangible connection, operable upon insertion into said recorder to provide battery power thereto and to receive and record the cardiac signals from said recorder, and
   (c) a magnetic tape playback apparatus having its own power supply and so structured as to permit insertion of only the cassette portion of said cassette and battery pack assembly and to block insertion of the assembly, and operable to play back the recorded cardiac signals whereby the use of a completely assembled cassette and battery pack having a fresh battery and blank tape for a recording session is assured.

2. The cardiac recording and playback system as defined in claim 1 wherein said tape cassette and battery pack assembly are characterized in that said frangible connection between said cassette and said battery pack comprises two electrical conductors attached to said battery pack and extending through said cassette to contact with electrical power-receiving contacts in said recorder, and said conductors are provided with a frangible portion closely adjacent to said battery pack such that, when broken apart, a portion of said conductors remain within the cassette to prevent insertion of another battery thereinto.

* * * * *